United States Patent Office 3,365,456
Patented Jan. 23, 1968

3,365,456
RESERPINE-LIKE COMPOUNDS
Theodor Petrzilka, Bottmingen, Basel-Land, Albert Frey, Basel, Albert Hofmann, Bottmingen, Basel-Land, Hans Ott, Basel, Hansruedi Schenk, Binningen, Basel-Land, and Franz Troxler, Basel, Switzerland, assignors to Sandoz Ltd., Basel, Switzerland
No Drawing. Filed Apr. 14, 1958, Ser. No. 728,112
Claims priority, application Switzerland, Apr. 12, 1957, 44,967/57; May 22, 1957, 46,400/57; July 15, 1957, 48,023/57; Sept. 6, 1957, 50,214/57; Sept. 11, 1957, 50,408/57; Feb. 14, 1958, 55,865/58; Feb. 20, 1958, 56,075/58; Feb. 27, 1958, 56,388/58
4 Claims. (Cl. 260—287)

This invention relates to reserpine-like compounds of the general Formula I,

I
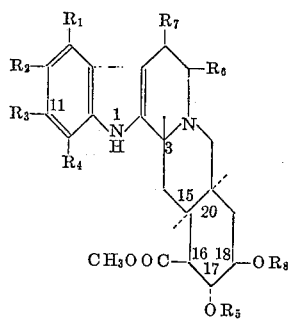

wherein $R_1$ to $R_4$ represent a hydrogen atom or a hydroxy, alkyl, alkoxy, alkylmercapto or aralkoxy group, $R_2$ and $R_3$ may also represent a methylene dioxy group, $R_5$ and $R_6$ a hydrogen atom or a low alkyl group, $R_7$ a hydrogen atom, and $R_8$ an acyl residue of the aliphatic, aromatic, or arylaliphatic series which may be substituted, except those compounds where $R_8$ is a 3,4,5-trimethoxy-benzoyl residue, $R_5$ is a methyl group, $R_1$, $R_2$, $R_4$, $R_6$ and $R_7$ are hydrogen atoms and $R_3$ is hydrogen or a methoxy group or the compound where $R_8$ is a 3,4,5-trimethoxy-cinnamoyl residue, $R_5$ is a methyl group, $R_3$ is a methoxy group and $R_1$, $R_2$, $R_4$, $R_6$ and $R_7$ are hydrogen atoms.

Such compounds are previously unknown and can be obtained by subjecting a bromoketone of the Formula II, II
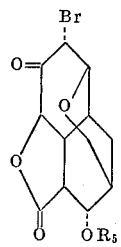

wherein $R_5$ possesses the above significance, to the action of zinc dust in the presence of acetic anhydride, by reacting the bicyclic unsaturated keto-acid thus produced of Formula III, III
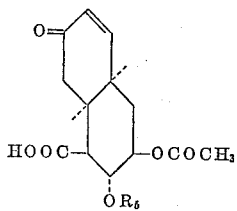

if desired, after separtion into the uniform optical antipodes according to known methods, with periodic acid or sodium periodate in the presence of a catalytic amount of osmium tetroxide, by esterifying the aldehyde dicarboxylic acid produced with diazomethane, by condensing the dimethyl ester with a substituted tryptamine of the general Formula IV, IV
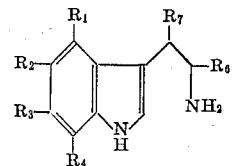

wherein the substituents $R_1$ to $R_4$ and $R_6$ and $R_7$ possess the above significance, by reducing and saponifying the Schiff's base thus produced to form a tetracyclic lactam of the Formula V, V
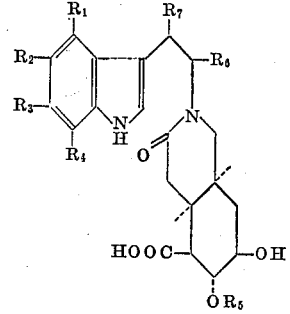

wherein the substituents $R_1$ to $R_7$ possess the above significance, converting the lactam V by a known method into the lactone-lactam of the Formula VI VI
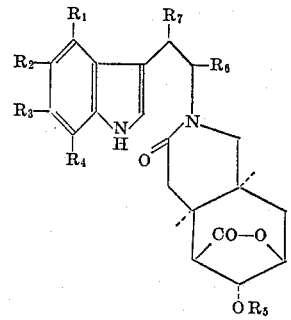

and subjecting the lactone-lactam to a ring closure according to Bischler-Napieralski, reducing the 3-dehydro-lactone of the Formula VII VII
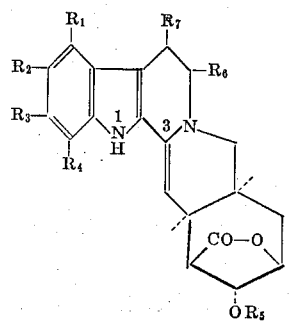

thus obtained according to known methods to form a substituted isodeserpidic acid lactone of the Formula VIII, VIII
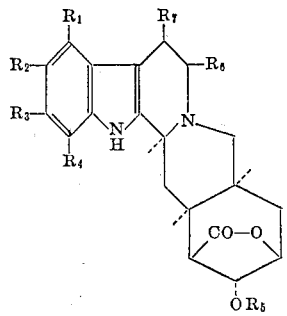

by causing rearrangement of the lactone VIII according to known methods to the corresponding disubstituted deserpidic acid lactone of the Formula IX IX
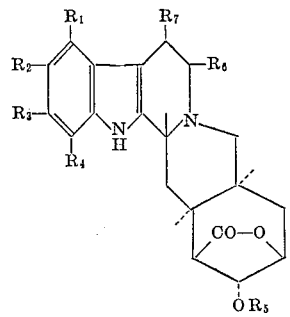

by converting the lactone IX by methanolysis into a substituted deserpidic acid methyl ester, by converting the hydroxy ester thus produced into the desired reserpine-like compounds of the Formula I by esterification with a carboxylic acid of the aliphatic, aromatic, or arylaliphatic series, which may be substituted, according to known methods, and converting a benzyloxy-substituent into a free hydroxy group by reductive splitting off of the benzyl group according to known methods, if desired.

Reserpine (Formula I: $R_1$, $R_2$, $R_4$, $R_6$, and $R_7$=H, $R_3$=$OCH_3$, $R_5$=$CH_3$, $R_8$=3,4,5-trimethoxy-benzoyl) represents the main alkaloid of the Rauwolfia species, apart from Ajmalin which has been known for some time, whilst deserpidine (Formula I: $R_1$, $R_2$, $R_3$, $R_4$, $R_6$, and $R_7$=H, $R_5$=$CH_3$, $R_8$=3,4,5-trimethoxy-benzoyl) and rescinnamine (Formula I: $R_1$, $R_2$, $R_4$, $R_6$, and $R_7$=H, $R_3$=$OCH_3$, $R_5$=$CH_3$, $R_8$=3,4,5-trimethoxycinnamoyl) represent two of the numerous subsidiary alkaloids which occur in this species of the apocynacees.

In recent years, reserpine, deserpidine, and rescinnamine have attained considerable therapeutic importance, since they permit successful treatment of hypertony and mental disturbances on account of their blood pressure depressent and sedative properties. Admittedly, these alkaloids sometimes give rise to side-effects which can sometimes be unpleasant and in some cases may lead to interruption of treatment. Most frequently, there is occurrence of mental depression, tiredness, hyperacidity of the stomach, diarrhoea, dyspnosis or asthma, oedaema (anti-diuretic effect), and sometimes there are peptic ulcers, Parkinsonism, and attacks of Grand-Mal [H. A. Schroeder and H. M. Perry, J. Amer. Med. Assoc. 159, 839 (1955); Editorial, Brit. Med. J. 1955 II, 1378]. It would therefore appear desirable to have available compounds with similar activity, which retain the therapeutically valuable properties but which do not exhibit the side effects of the natural alkaloids or only exhibit them to a reduced degree.

It is already known [L. Dorfman et al., Helv. Chim. Acta 37, 59 (1954)] that reserpine-like compounds may be obtained, e.g. by saponification of reserpine and subsequent esterification and acylation. This process merely yields new derivatives with different substitution in the 16- and 18-positions. The methoxy-groups in the 11- and 17-positions remain unchanged, and it is their variation which is to be expected to yield derivatives with interesting pharmacodynamic properties. Moreover, a process using natural alkaloids as starting materials is hardly economic. Since the subsequent introduction of optional substituents into all desired positions of the molecule is not possible in practice, it is necessary to develop a process for the total synthesis in order to obtain the desired substituted reserpine-like compounds.

It is also known [R. B. Woodward et al., J. Am. Chem. Soc., 78, 2023 and 2657 (1956)] that reserpine can be prepared by total synthesis. As for all other natural substances, its total synthesis represented the final aim of the elucidation of the structure of reserpine, moreover, it served the purpose of proving once and for all the configuration assigned to the six centres of asymmetry (C-atoms 3,15,16,17,18, and 20). The synthesis described by Woodward in fact only yields reserpine already known.

It has now been possible to develop a process which has proved sufficiently rational and economic by the systematic avoidance of unnecessary intermediate stages, by the separation of the optical antipodes at a much earlier stage, by the saving of reagents, particularly of the tryptamine component, by the lactonisation which is already carried out at the lactam stage, and by the considerably improved yields obtained at every stage of reaction to allow a satisfactory overall yield for the total synthesis of optionally substituted reserpine-like compounds on a technical scale. As starting material there is employed a bromoketone of the above Formula II.

A process embodying the invention is preferably carried out in the following manner:

1 part of bromoketone of the Formula II [prepared according to J. Am. Chem. Soc. 78, 2023 (1956)] is suspended in 25 times its weight of acetic anhydride and stirred at slightly elevated temperature for several minutes with 1 part of zinc dust, whereby the bromoketone dissolves and the bicyclic, unsaturated acetoxy-keto-acid of the Formula III is obtained in a yield of 70–80% of the theoretical.

These previously unknown acetoxy-acids III differ from the corresponding previously known oxy-acid (III, $R_5$=$CH_3$) by a considerably decreased solubility in water, so that they can be readily isolated by ordinary extraction with methylene chloride or chloroform. For further reaction of the keto-acids, the hydroxyl group situated in the $\beta$-position to the carboxyl group must be present in a protected form which is already the case with the acetylated compounds III. An additional reaction step is thus avoided. Since the acetoxy-acids III can readily be oxidised to the corresponding aldehyde-dicarboxylic acids, esterification with diazomethane is also avoided at this stage.

The acetoxy-acids III already contain 5 of the 6 centres of asymmetry present in reserpine, deserpidine, and rescinnamine, and may readily and quantitatively be separated into their optical antipodes, via the salt, with a suitable asymmetric base. The preferred separation into the optical antipodes at this early stage enables up to half of the expensive reagents, such as osmium tetroxide, tryptamine component, sodium boron hydride, etc. to be saved, thus improving the economic potential of the synthesis.

By oxidation of the actoxy-acids III with periodic acid or sodium periodate in the presence of a mere catalytic amount of osmium tetroxide there are formed, via the diols, the corresponding aldehyde-dicarboxylic acids which are directly converted with diazo methane to give the dimethyl esters and condensed with the tryptamine-component IV. Reduction of the Schiff's bases produced with sodium boron hydride and saponification of the reaction product with methanolic sodium hydroxide solution yields the tetracyclic lactams of the Formula V in well-crystalline form. Oxidation of the acetoxy-acids III, condensation with the tryptamine component IV, reduction, ring closure, and saponification to the lactams V proceeds with an overall yield of 65-75% of the theoretical. If the lactams V are now warmed with acetic anhydride and sodium acetate, lactonisation occurs with formation of the lactone-lactams of Formula VI. Lactonisation of the hydroxy-acid lactams V to the lactone-lactams VI is preferably carried out at this stage, since both compounds V and VI are completely stable under normal lactonisation conditions. Yields amount to 80-90%.

The lactone-lactams VI are cyclised with phosphorus oxychloride to the substituted 3-dehydro-deserpidic acid lactones VII, which can usually be readily isolated in a crystalline form and purified. This was not to be expected, since the literature generally describes 3-dehydro-compounds of reserpic acid or yohimbin-derivatives as unstable compounds which can only be isolated in the form of their salts.

The previously unknown 3-dehydro-lactones VII are reduced to substituted isodeserpidic acid lactones of the Formula VIII according to methods known as such, e.g. with sodium boron hydride or catalytically activated hydrogen. Ring closure of the laactams VI and the subsequent reduction to give the lactones VIII proceed with an overall yield of 80-90%.

When the substituted isodeserpidic acid lactones VIII are dissolved, e.g. in xylene, and boiled with pivalic acid, rearrangement occurs to give substituted deserpidic acid lactones IX, which on methanolysis, e.g. by heating under reflux with sodium methylate and methanol, yield the corresponding substituted deserpidic acid methyl esters. During acylation with a suitable carboxylic acid, e.g. by treatment with the acid chloride in pyridine, the desired substituted reserpine-like compounds of the Formula I are obtained. The yields of these reaction steps are practically quantitative.

A process embodying the invention enables the total synthesis of arbitrarily substituted reserpine-like compounds to be carried out on a technical scale. The previously unknown compounds are intended to be introduced in therapy as free bases or in the form of their salts with inorganic or organic acids.

In the following examples which are given to illustrate the invention but in no way to limit it, all temperatures are given in degrees centigrade.

EXAMPLE 1.—(—)-11-METHYL-DESERPIDINE (I) *1,2,3,4,7,8,9,10-octahydro-2-methoxy-3-acetoxy-7-oxo-1-naphthoic acid*

200 g. of decahydro-2-methoxy-3,5-oxido-6-bromo-7-oxo - 8 - hydroxy - 1 - naphthoic acid lactone (Formula II: $R_5=CH_3$) of M.P. 165–167° (corrected) [preparation, cf. J. Am Chem. Soc. 78, 2023 (1956)] are suspended in 5000 cc. of acetic acid anhydride and treated with 200 g. of zinc dust with intense stirring at a temperature of 40°, the reaction vessel being cooled externally with ice-water immediately after addition of the zinc dust. Despite this cooling, the temperature of the solution rises within 2½ minutes from 40° to 59°, and then rapidly falls again. After a total reaction time of 5 minutes, the zinc dust is filtered off, the filtrate is evaporated in a water-jet vacuum at 70–80°, the residue is dissolved in 250 cc. of acetone and 400 cc. of water, the solution is allowed to stand at room temperature for several hours to saponify the mixed anhydrides thus produced and then diluted with 2000 cc. of water and extracted thrice with chloroform. The solution is dried over sodium sulphate and on evaporation leaves a partially crystalline residue, which yields from acetone-ether 128 g. of 1,2,3,4,7,8,9,10-octahydro - 2 - methoxy - 3 - acetoxy - 7 - oxo - 1 - naphthoic acid (Formula III: $R_5=CH_3$) of melting point 210–215° (uncorrected) corresponding to a yield of about 72% of the theoretical.

(II) (—)-*hydroxy acid lactam* (*Formula V:* $R_3=R_5=CH_3$)

(a) *Separation into the optical antipodes.*—62 g. of racemic acetoxy-acid (Formula III: $R_5=CH_3$) and 73 g. of strychnine are dissolved in 2 litres of methanol, the clear solution is evaporated to half-volume, whereupon on cooling 50 g. of strychnine salt of the (—)-acetoxy-acid crystallises out as prisms of M.P. 240–241° (uncorrected), $[\alpha]_D=-122°$ (c.=0.2, in ethanol). Concentration of the mother liquor yields another 11.5 g. of salt of the same purity, so that the yield amounts to 61.5 g., i.e. 91% of the theoretical. The strychnine salt of the (+)-acetoxy-acid remains in the mother liquor.

To obtain the free (—)-acetoxy-acid, the produced 61.5 g. of strychnine salt are suspended in 200 cc. of water and treated, with ice-cooling, with 80 cc. of 2 N ammonium hydroxide solution. After stirring at 0° for 5 minutes, the separated strychnine is filtered off, the filtrate is treated with hydrochloric acid until acid to Congo, and extracted repeatedly with ethyl acetate. The ethyl acetate extract is dried over sodium sulphate, evaporated to dryness, and the residue recrystallised from methanol, whereupon the (—)-acetoxy-acid (Formula III: $R_5=CH_3$) is obtained as intensely light-refracting plates of melting point 223–225° (uncorrected), $[\alpha]_D=-219°$ (c.=0.2, in ethanol). Yield 26.6 g. or 86% of the theorectical.

On evaporation of the mother liquor of the strychnine salt of the (—)-acetoxy-acid, the strychnine salt of the (—)-acetoxy-acid, the strychnine salt of the (+)-acetoxy-acid is obtained as a colourless resin. It is dissolved in 200 cc. of water, the solution is treated, with ice cooling, with 80 cc. of 2 N ammonium hydroxide solution, the separated strychnine is filtered off, and the (+)-acetoxy-acid (Formula III: $R_5=CH_3$) is separated as described above. After a single recrystallisation from methanol, there are obtained 27.9 g. of plates of M.P. 22–224° (uncorrected), $[\alpha]_D=+217°$ (c.=0.2, in ethanol).

(b) *Oxidation of the* (—)-*acetoxy-acid, condensation with 6-methyl-tryptamine, reduction, ring closure, and saponification to V.*—2.82 g. of (—)-1,2,3,4,7,8,9,10-octahydro-2-methoxy-3-acetoxy-7-oxo-1 - naphthoic acid (Formula III: $R_5=CH_3$) are dissolved in 30 cc. of dioxan, the solution is treated with 30 mg. of solid osmium tetroxide and then with 11.4 g. $HIO_4 \cdot 2H_2O$ in 50 cc. of water and 50 cc. of 1 N caustic soda. After allowing to stand at room temperature for 15 hours, the solution is extracted thrice with ethyl acetate, the extract dried over sodium sulphate, filtered, and the filtrate is treated with ethereal diazomethane solution until a permanent yellow colour is attained. The solution is evaporated to dryness in vacuo at a bath temperature of about 35°, the residue is taken up in 25 cc. of benzene and treated with a solution of 1.90 g. of 6-methyl-tryptamine (Formula IV: $R_1$, $R_2$, $R_4$, $R_6$ and $R_7$=H, $R_3=CH_3$) in 35 cc. of benzene. After allowing to stand at room temperature for 10 minutes, 30 cc. of absolute methanol and 1.8 g. of sodium boron hydride are added, the mixture is warmed on the water bath for 10 minutes, and 30 drops of glacial acetic acid are added to the clear solution. After concentration in vacuo, it is distributed between 1 N hydrochloric acid and methylene chloride. The solution in methylene chloride is washed with water and a saturated solution of common salt, and the aqueous extracts are extracted twice with methylene chloride. The united methylene chloride extracts are dried over sodium sulphate and the solvent is removed in vacuo. The amorphous residue is dissolved in a mixture of 30 cc. of methanol and 30 cc. of 1 N sodium hydroxide solution, the solution is heated to boiling under reflux for 90 minutes, acidified with hydrochloric acid until acid to Congo and the major portion of the methanol is removed in vacuo, whereupon 2.3 g. of (—)-hydroxy-acid lactam of the Formula V, wherein $R_1$, $R_2$, $R_4$, $R_6$ and $R_7$=H, $R_3$ and $R_5$=$CH_3$, are obtained, corresponding to a yield of 58% of the theoretical. Polyhedra from diluted methanol of M.P. 153–155° (uncorrected), $[\alpha]_D^{20}$=+50° (c.=0.2, in pyridine).

(III) *(—)-11-methyl-isodeserpidic acid lactone*

(a) *Lactone-lactam.*—2.2 g. of (—)-hydroxy - acid lactam and 1.0 g. of anhydrous sodium acetate are heated to boiling under reflux in a solution of 80 cc. of benzene and 8 cc. of acetic anhydride for 15 hours, the substance dissolving within 1 hour. After cooling, the whole is evaporated to dryness in vacuo, and the residue is distributed between sodium hydrogen carbonate solution and methylene chloride. From the amorphous residue (2.0 g.) of the methylene chloride solution the lactone-lactam (Formula VI: $R_1$, $R_2$, $R_4$, $R_6$ and $R_7$=H, $R_3$ and $R_5$=$CH_3$) crystallises from ethyl acetate as rhombohedric plates of M.P. 169–171° (corrected), $[\alpha]_D^{20}$=—38° (c.=0.2, in pyridine).

(b) *(—)-3-dehydro-11-methyl - deserpidic acid lactone.*—1.65 g. of the lactone - lactam described under (IIIa) is heated under reflux in a solution of 35 cc. of freshly distilled phosphorus oxychloride in an atmosphere of nitrogen for 2 hours. The brownish solution is evaporated to dryness in vacuo, the residue is dissolved in methylene chloride, the solution is extracted with dilute ammonium hydroxide solution, dried over sodium sulphate, and on concentration and replacement of the methylene chloride by methanol, (—)-11-methyl-3-dehydro-deserpidic acid lactone (Formula VII: $R_1$, $R_2$, $R_4$, $R_6$ and $R_7$=H, $R_3$ and $R_5$=$CH_3$) crystallises as needles of M.P. 301–303° (corrected). $[\alpha]_D^{20}$=+125° (c.=0.2, in pyridine). Yield 80% of the theoretical.

(c) *(—)-11-methyl - isodeserpidic acid lactone.*—1.15 g. of (—)-11-methyl-3-dehydro-deserpidic acid lactone are suspended in a mixture of 15 cc. of methanol and 15 cc. of methylene chloride, and the mixture is treated at room temperature in two portions with 1.3 g. of sodium boron hydride. After the reaction is completed, a little acetic acid is added and the solution is then evaporated to dryness. The remaining residue is distributed between dilute ammonium hydroxide solution and methylene chloride. After evaporation of the solvent, there is obtained (—)-11-methyl-isodeserpidic acid lactone of the Formula VIII, wherein $R_1$, $R_2$, $R_4$, $R_6$, and $R_7$ represent H, $R_3$ and $R_5$ represent $CH_3$, as an amorphous residue which as far has not been crystallised.

(IV) *(—)-11-methyl-deserpidine*

(a) *Rearrangement.*—1.3 g. of crude 11-methyl-isodeserpidic acid lactone are heated under reflux with 10 cc. of a solution of xylene/pivalic acid (8:2) for 15 hours in an atmosphere of nitrogen. The solution is then evaporated to dryness in vacuo, and the residue is distributed between methylene chloride and diluted ammonium hydroxide solution. The residue from the methylene chloride solution with alcohol yields crystalline (—)-11-methyl-deserpidic acid lactone (Formula IX: $R_1$, $R_2$, $R_4$, $R_6$, and $R_7$=H, $R_3$ and $R_5$=$CH_3$) as needles of M.P. 320–330° (corrected), $[\alpha]_D^{20}$=+24° (c.=0.2 in pyridine). Yield 75% of the theoretical.

(b) *(—)-11-methyl-deserpidine.*—0.38 g. of the (—)-11-methyl-deserpidic acid lactone described under (IVa) are heated under reflux for 1½ hours in a dilute sodium methylate solution (prepared by dissolving 60 mg. of sodium in 20 cc. of absolute methanol), with exclusion of water. After cooling, the clear solution is exactly neutralised with dilute hydrochloric acid and evaporated to dryness in vacuo. The residue is then distributed between methylene chloride and dilute ammonium hydroxide solution. The residue from the methylene chloride solution is dissolved in 5 cc. of pyridine and the solution is treated with 0.45 g. of 3,4,5-trimethoxy-benzoyl chloride and is left to stand at room temperature for 2 hours. The solution is then treated with 1 cc. of water, allowed to stand at room temperature for ½ hour, rinsed into a separating funnel with methylene chloride, extracted successively with dilute hydrochloric acid, dilute ammonium hydroxide solution, and water, dried over sodium sulphate, and the solvent is evaporated in vacuo. From the residue (—)-11-methyl-deserpidine (Formula I: $R_1$, $R_2$, $R_4$, $R_6$, and $R_7$=H, $R_3$ and $R_5$=$CH_3$, $R_8$=3,4,5-trimethoxy-benzoyl) crystallised from ethanol as prisms of M.P. 269–271° (corrected), $[\alpha]_D^{20}$=—153° (c.=0.2, in pyridine). Yield 59% of theoretical.

EXAMPLE 2.—(—)-10-METHOXY-DESERPIDINE (I) First, 1,2,3,4,7,8,9,10-octahydro-2-methoxy-3-acetoxy-7-oxo-1-naphthoic acid (Formula III: $R_5$=$CH_3$) is prepared and separated into the optical antipodes, as described in Example 1 under (I) and (IIa).

(II) *Hydroxy-acid lactam (Formula V: $R_2$=$OCH_3$, $R_5$=$CH_3$)*

5.64 g. of (—)-acetoxy-acid (Formula III: $R_5$=$CH_3$) are oxidised as described in Example 1 under (IIb), the oxidation product is esterified with diazomethane, the aldehyde-dicarboxylic acid ester thus produced is condensed with 5-methoxy-tryptamine, the Schiff's base thus formed is reduced and saponified. 5.21 g. of (—)-hydroxy-acid-lactam of the Formula V are obtained, wherein $R_1$, $R_3$, $R_4$, $R_6$, and $R_7$=H, $R_2$=$OCH_3$, and $R_5$=$CH_3$, corresponding to a yield of 63% of the theoretical. This compound crystallises from methanol/ether as needles of double melting point 136° and 153° (uncorrected), $[\alpha]_D^{20}$=+37° (c.=0.2, in pyridine).

(III) *(—)-10-methoxy-isodeserpidic acid lactone*

(a) *Lactone-lactam.*—2.5 g. of (—)-hydroxy-acid lactam are heated to boiling under reflux overnight in benzene with acetic anhydride/sodium acetate, as described in Example 1 under (IIIa). The lactone-lactam (Formula VI: $R_1$, $R_3$, $R_4$, $R_6$, and $R_7$=H, $R_2$=$OCH_3$, $R_5$=$CH_3$) is obtained from ethyl acetate as needles of M.P. 178–180° (uncorrected), $[\alpha]_D^{20}$=—25° (c.=0.4, in pyridine). Yield 92% of the theoretical.

(b) *(—)-3-dehydro-10-methoxy-deserpidic acid lactone.*—0.2 g. of the lactone-lactam described under (a) are treated with phosphorus oxychloride and worked up as described in Example 1 under (IIIb). The compound is obtained from methanol. Needles of M.P. 268–270° (uncorrected), $[\alpha]_D^{20}$=+121° (c.=0.3, in pyridine). Yield 92% of the theoretical.

(c) *(—)-10-methoxy-isodeserpidic acid lactone.*—0.17 g. of (—)-3-dehydro-10-methoxy-deserpidic acid lactone are dissolved in 4 cc. of 50% aqueous acetic acid and shaken with 0.03 g. of prehydrogenated platinum catalyst in an atmosphere of hydrogen, whereby the amount of hydrogen calculated for 1 mol is almost absorbed during 4 hours. After the hydrogen absorption is completed, the catalyst is filtered off, the filtrate is concentrated in vacuo, the residue is dissolved in methylene chloride, the solution is extracted with dilute ammonium hydroxide solution, dried over sodium sulphate, and evaporated to dryness in vacuo. The residue yields from benzene (—)-10-methoxy-isodeserpidic acid lactone of the Formula VIII, wherein $R_1$, $R_3$, $R_4$, $R_6$, and $R_7$=H, $R_2$=$OCH_3$, and $R_5$=$CH_3$. Needles of M.P. 140–142° and 212° (double M.P. uncorrected), $[\alpha]_D^{20}$=—91° (c.=0.3, in pyridine). Yield 94% of theory.

(IV) *(—)-10-methoxy-deserpidine*

(a) *Rearrangement.*—0.765 g. of 10 - methoxy - isodeserpidic acid lactone are treated with pivalic acid/xylene and worked up as described in Example 1 under (IVa). Chromatographic separation yields 10-methoxy-deserpidic acid lactone (Formula IX: $R_1$, $R_3$, $R_4$, $R_6$, and $R_7$=H, $R_2$=$OCH_3$, $R_5$=$CH_3$) which is obtained from methanol as needles of M.P. 283–284° (corrected), $[\alpha]_D^{20} = +60°$ (c.=0.2, in pyridine).

(b) *10-methoxy-deserpidine.*—0.475 g. of 10-methoxy-deserpidic acid lactone are converted into the methyl ester according to the method described in Example 1 under (IVb) and this is converted directly into the 3,4,5-trimethoxy-benzoate. The compound crystallises from methanol as needles of M.P. 160–161° (corrected), $$[\alpha]_D^{20} = -161° \text{ (c.=0.3, in pyridine).}$$

EXAMPLE 3.—(—)-11-ETHOXY-DESERPIDINE (I/II) *Hydroxy-acid-lactam* (*Formula V:* $R_3 = OC_2H_5$, $R_5 = CH_3$)

2.55 g. of (—)-acetoxy-acid (Formula III: $R_5 = CH_3$) (prepared according to the methods described in Example 1) are oxidised as described under (IIb) in Example 1, the oxidation product is condensed with 6-ethoxy-tryptamine after esterification with diazo-methane, the Schiff's base produced is reduced and saponified. 2.15 g. of (—)-hydroxy-acid lactam of Formula V are obtained wherein $R_1$, $R_2$, $R_4$, $R_6$, and $R_7 = H$, $R_3 = OC_2H_5$, and $R_5 = CH_3$, corresponding to a yield of 55% of the theoretical. The compound crystallises from methanol/water as needles of M.P. 152–154° (uncorrected), $$[\alpha]_D^{20} = +39° \text{ (c.=0.3, in pyridine)}$$

(III) (—)-*11-ethoxy-isodeserpidic acid lactone*

(a) *Lactone-lactam.*—2.0 g. of (—)-hydroxy-acid lactam and 0.8 g. of anhydrous sodium acetate are heated to boiling under reflux for 15 hours in a solution of 8 cc. of acetic anhydride in 80 cc. of benzene, the substance going into solution within one hour. After cooling and evaporation to dryness in vacuo, the residue is distributed between sodium hydrogen carbonate solution and chloroform. From the amorphous residue of the chloroform solution (2 g.) crystallises the lactone-lactam (Formula VI: $R_1$, $R_2$, $R_4$, $R_6$, and $R_7 = H$, $R_3 = OC_2H_5$, $R_5 = CH_3$) as needles of M.P. 169–171° (uncorrected) (from ethyl acetate), $[\alpha]_D^{20} = -130°$ (c.=0.3, in pyridine). Yield 70% of the theoretical.

(b) (—)-*3 - dehydro - 11-ethoxy-deserpidic acid lactone.*—1.25 g. of the lactone-lactam described under (a) are heated to boiling under reflux in an atmosphere of nitrogen for 2 hours with a solution of 25 cc. of freshly distilled phosphorus oxychloride. The yellow solution is evaporated to dryness in vacuo, the residue dissolved in methylene chloride, the solution extracted with dilute ammonium hydroxide solution, dried over sodium sulphate, and on concentration and replacement of the methylene chloride by methanol, (—)-3-dehydro-11-ethoxy-deserpidic acid lactone crystallises as fine needles of M.P. 290–293°. $[\alpha]_D^{20} = +180°$ (c.=0.3, in pyridine). Yield 0.915 g. or 76% of theoretical.

(c) (—)-*11-ethoxy-iso-deserpidic acid lactone.*—0.82 g. of (—)-11-ethoxy-dehydro-deserpidic acid lactone are dissolved in a mixture of 10 cc. of methanol and 20 cc. of methylene chloride, and the solution is treated at room temperature, in 2 portions, with 1 g. of sodium boron hydride. After the reaction is completed, a little acetic acid is added and the solution is then evaporated to dryness. The remaining residue is distributed between diluted ammonium hydroxide solution and methylene chloride. After evaporation of the solvent, (—)-11-ethoxy-iso-deserpidic acid lactone of Formula VIII is obtained, wherein $R_1$, $R_2$, $R_4$, $R_6$, and $R_7 = H$, $R_3 = OC_2H_5$, and $R_5 = CH_3$, which crystallises from ethyl acetate as prisms, M.P. 195–198° (uncorrected), $[\alpha]_D^{20} = -130°$ (c.=0.2, in pyridine). Yield 0.720 g. or 87% of the theoretical.

(IV) *11-ethoxy-deserpidine*

(a) *Rearrangement.*—0.62 g. of 11-ethoxy-isodeserpidic acid lactone are treated with pivalic acid/xylene according to the instruction given under (IVa) in Example 1. 11-ethoxy-deserpidic acid lactone crystallises from methanol as needles of M.P. 321–323° (corrected) $[\alpha]_D^{20} = +92°$ (c.=0.2, in pyridine).

(b) *11-ethoxy-deserpidine.*—0.4 g. of 11-ethoxy-deserpidic acid lactone are converted into the methyl ester as described under (IVb) in Example 1 and this is directly converted to the 3,4,5-trimethoxy-benzoate. 11-ethoxy-deserpidine (Formula I: $R_1$, $R_2$, $R_4$, $R_6$, and $R_7 = H$, $R_3 = OC_2H_5$, $R_5 = CH_3$, and $R_8 = 3,4,5$-trimethoxy-benzoyl) crystallises from methanol as needles of M.P. 282–283° (corrected), $[\alpha]_D^{20} = -158°$ (c.=0.2, in pyridine).

EXAMPLE 4.—(—)-10,11-METHYLENEDIOXY-DESERPIDINE (I/II) *Hydroxy-acid lactam* (*Formula V:* $R_2 + R_3 = -O.CH_2.O-$, $R_5 = CH_3$)

1.21 g. of (—)-acetoxy-acid (Formula III: $R_5 = CH_3$) (prepared according to the method described in Example 1) are oxidised as described in Example 1 under (IIb), the oxidation product is esterified with diazomethane, the aldehyde-dicarboxylic acid ester thus formed condensed with 5,6-dioxymethylene-tryptamine, and the Schiff's base thus formed is reduced. After saponification of the reduction product, 1.09 g. of (—)-hydroxy-acid lactam of the Formula V is obtained, wherein $R_2$ and $R_3$ represent a dioxy-methylene group and $R_1$, $R_4$, $R_6$, and $R_7 = H$, $R_5 = CH_3$. The new compound crystallises from methanol/water as rhombic small leaves of M.P. 154–155°, $[\alpha]_D^{20} = +47°$ (c.=0.3, in pyridine). Yield 59% of the theoretical.

(III) (—)-*10,11-methylenedioxy-isodeserpidic acid lactone*

(a) *Lactone-lactam.*—1.09 g. of (—)-hydroxy-acid lactam are treated in benzene with acetic anhydride and sodium acetate, as described in Example 1 under (IIIa). The lactone-lactam is obtained from ethyl acetate as needles of M.P. 219–220°, $[\alpha]_D^{20} = -34°$ (c.=0.2, in pyridine). Yield 87% of the theoretical.

(b) (—)-*3-dehydro-10,11-dioxymethylene - deserpidic acid lactone.*—0.4 g. of the lactone-lactan described under (a) are treated with phosphorus oxychloride and worked up as described in Example 1 under (IIIb). The dehydro-compound is obtained from methanol as needles of M.P. 276°, $[\alpha]_D^{20} = +98°$ (c.=0.2, in pyridine). Yield 67% of the theoretical.

(c) (—)-*10,11-dioxymethylene-isodeserpidic acid lactone.*—0.113 g. of the dehydro-lactone described under (b) are catalytically hydrogenated and worked up as described in Example 2, under (IIIc). (—)-10,11-dioxymethylene-isodeserpidic acid lactone of Formula VIII is obtained, wherein $R_1$, $R_4$, $R_6$, and $R_7 = H$, $$R_2 + R_3 = -O.CH_2O-$$

and $R_5 = CH_3$, from methanol as plates of M.P. 146–147°, $[\alpha]_D^{20} = -80°$ (c.=0.2, in pyridine). Yield 85% of theory.

(IV) (—)-*10,11-methylenedioxy-deserpidine*

(a) *Rearrangement.*—0.970 g. of 10,11-dioxy-methylene-isodeserpidic acid lactone are boiled under reflux in an atmosphere of nitrogen with 20 cc. of a 9:1 xylene/pivalic acid solution for 16 hours. After this period of time, the crystalline precipitate thus formed is filtered off, the filtrate is evaporated to dryness in vacuo, and the residue is distributed between dilute ammonium hydroxide solution and methylene chloride. The residue from the methylene chloride solution yields from methanol a further amount of material in the form of needles, which are united with the directly separated crystals and recrystallized from methanol. (—)-10,11-dioxy-methylene-deserpidic acid lactone is obtained from methanol as needles of M.P. 310–313° (corrected), and $[\alpha]_D^{20} = +50°$ (c.=0.3, in pyridine).

(b) *Hydroxy-ester.*—0.2 g. of 10,11-dioxymethylene-deserpidic acid lactone are boiled under reflux, with exclusion of water, for 1½ hours in a dilute sodium methylate solution (prepared by dissolving 28 mg. of sodium in 10 cc. of anhydrous methanol). After cooling, the clear solution is exactly neutralised with dilute hydrochloric acid and evaporated to dryness in vacuo. The residue is distributed between methylene chloride and dilute ammonium hydroxide solution. The hydroxy-ester crystallises from the amorphous residue as needles of M.P. 222–224° (corrected). $[\alpha]_D^{20} = -118°$ (c.=0.3 in pyridine).

(c) $(-)$-10,11-dioxymethylene-desperidine.—0.2 g. of $(-)$-10,11-dioxymethylene-deserpidic acid lactone are converted into the hydroxy-ester as described under (b); the latter, in the amorphous form, is dissolved directly in 2 cc. of pyridine, the solution is treated with 0.23 g. of 3,4,5-trimethoxy-benzoyl chloride and the reaction mixture allowed to stand at room temperature for 2 hours. Then, 0.5 cc. of water are added and it is allowed to stand at room temperature for ½ hour, rinsed with methylene chloride into a separating funnel, extracted successively with dilute hydrochloric acid, dilute ammonium hydroxide solution, and water, dried over sodium sulphate, and the solvent is evaporated in vacuo. $(-)$-10,11-dioxymethylene-deserpidine crystallises from the residue in methanol as needles of M.P. 251–253° (corrected). $[\alpha]_D^{20} = -164°$ (c.=0.2, in pyridine).

EXAMPLE 5.—$(-)$, $(l)$-5-METHYL-RESERPINE [1]

(I/II) *Hydroxy-acid lactam (Formula V:*
$R_3=OCH_3$, $R_5$ and $R_6=CH_3$)

3.95 g. of $(-)$-acetoxy acid (Formula III: $R_5=CH_3$) (prepared according to the method described in Example 1) are oxidised, the oxidation product is esterified with diazomethane, the aldehydedicarboxylic acid ester thus formed is condensed with (d,l)-6-methoxy-α-methyltryptamine,[2] and the Schiff's base thus produced is reduced, as described in Example 1 under (IIb). After saponification of the reduction product, there is obtained $(-)$, (d,l)-hydroxy-acid lactam[2] of the Formula V, wherein $R_1$, $R_2$, $R_4$, and $R_7=H$, $R_3=OCH_3$, $R_5$ and $R_6=CH_3$. The new compound is an amorphous foam which does not crystallise and has not been characterised in detail.

(III) $(-)$, $(l)$-5-methyl-isoreserpic acid lactone (a) *Lactone-lactam.*—3.3 g. of $(-)$, (d,l)-hydroxy-acid lactam[2] are boiled under reflux in benzene with acetic anhydride and sodium acetate overnight, as described in Example 1 under (IIIa). $(-)$, (l)-lactone-lactam is obtained from ethyl acetate as prisms of M.P. 227–229° (corrected). $[\alpha]_D^{20} = -59°$ (c.=0.2, in pyridine). After separation of the crystalline $(-)$, (l)-lactone-lactam, the $(-)$, (d)-lactone-lactam is obtained as an amorphous residue.

(b) $(-)$, $(l)$ - 3-dehydro-5-methyl-reserpic acid lactone.—0.66 g. of $(-)$, (l)-lactone-lactam described under (a) are treated with phosphorus oxychloride and worked up as described in Example 1 under (IIIb). The compound is obtained as a crystalline residue, which was not characterised in detail.

(c) $(-)$, $(l)$-5-methyl-isoreserpic acid lactone.—0.59 g. of $(-)$, (l)-3-dehydro-5-methyl-reserpic acid lactone described under (b) are reduced with sodium boron hydride and worked up as described in Example 1 under (IIIc). $(-)$, (l)-5-methyl-isoreserpic acid lactone of the Formula VIII, wherein $R_1$, $R_2$, $R_4$, and $R_7=H$, $R_3=OCH_3$, $R_5$ and $R_6=CH_3$, crystallises from ethyl acetate as prisms of M.P. 241–243° (corrected). $[\alpha]_D^{20} = 141°$ (c.=0.2, in pyridine).

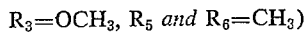
[1] The term "(l)" refers to the laevorotatory antipode of 6-methoxy-α-methyl-tryptamine.

[2] The term "(d,l)" refers to racemic 6-methoxy-α-methyltryptamine.

(IV) $(-)$,$(l)$-methyl-reserpine (a) *Rearrangement.*—0.345 g. of $(-)$,(l) - 5 - methyl-isoreserpic acid lactone are treated with a 10% solution of pivalic acid and worked up as described in Example 1 under (IVa). $(-)$,(l) - 5 - methyl - reserpic acid lactone crystallises from methanol as prisms of M.P. 281–283°. $[\alpha]_D^{20} = +76°$ (c.=0.2, in pyridine).

(b) $(-)$,$(l)$-5-methyl-reserpine.—0.31 g. of $(-)$,(l)-5-methyl-reserpic acid lactone are converted into the methyl ester and the latter is directly converted into the 3,4,5-trimethoxy-benzoate, as described in Example 1 under (IVb). The compound (Formula I: $R_1$, $R_2$, $R_4$, and $R_7=H$, $R_3=OCH_3$, $R_5$ and $R_6=CH_3$) crystallises from ether as fine prisms of M.P. 190–191° $[\alpha]_D^{20} = -141°$ (c.=0.2, in pyridine).

EXAMPLE 6.—$(-)$-17-DESMETHOXY-17-ETHOXY-RESERPINE (I) *1,2,3,4,7,8,9,10-octahydro-2-ethoxy-3-acetoxy-7-oxo-1-naphthoic acid*

2.0 g. of decahydro-2-ethoxy-3,5-oxido-6-bromo-7-oxo-8-hydroxy-1-naphthoic acid lactone (Formula II: $R_5=C_2H_5$) [preparation cf. J. Am. Chem. Soc. 78, 2023 (1956)] are treated in acetic anhydride with zinc dust and worked up as described under (I) in Example 1. The new compound (Formula III: $R_5=C_2H_5$) crystallises from acetone/ether as needles of M.P. 195–196°, yield 62% of theoretical.

(II) *Hydroxy-acid-lactam (Formula V:*
$R_3=OCH_3$, $R_5=C_2H_5$)

The racemic acetoxy-acid produced of Formula III, wherein $R_5=C_2H_5$, is first separated into the optical antipodes via the nor-ephedrine salt according to known methods. 1.55 g. of $(-)$-acetoxy-acid (Formula III: $R_5=C_2H_5$) are oxidised, the oxidation product is esterified, the aldehydedicarboxylic acid ester thus produced is condensed with 6-methoxy-tryptamine, and the Schiff's base thus formed is reduced, as described in Example 1 under (IIb). After saponification of the reduction product, there is obtained $(-)$-hydroxyacid lactam of the Formula V, wherein $R_1$, $R_2$, $R_4$, $R_6$, and $R_7=H$, $R_3=OCH_3$, and $R_5=C_2H_5$. Up to the present, it has not been possible to crystallise the compound.

(III) $(-)$-17-desmethoxy-17-ethoxy-isoreserpic acid lactone (a) *Lactone-lactam.*—2.0 g. of $(-)$-hydroxy-acid lactam in benzene are heated to boiling under reflux with acetic anhydride/sodium acetate overnight, as described in Example 1 under (IIIa). The lactone-lactam is obtained as amorphous residue, which up to the present has not been crystallised.

(b) $(-)$ - 3 - dehydro-17-desmethoxy-17-ethoxy-reserpic acid lactone.—0.86 g. of the amorphous lactone-lactam described under (a) are treated with phosphorus oxychloride and worked up, as described in Example 1 under (IIIb). The compound is obtained from ethanol as fine needles of M.P. 235–237* (corrected) $[\alpha]_D^{20} = +134°$ (c.=0.2, in pyridine).

(c) $(-)$ - 3 - dehydro-17-desmethoxy-17-ethoxy-isoreserpic acid lactone.—0.8 g. of 3-dehydrolactone described under (b) is reduced with sodium boron hydride and worked up as described in Example 1 under (IIIc). The new compound (Formula VIII: $R_1$, $R_2$, and $R_4=H$, $R_3=OCH_3$, $R_5=CH_2CH_3$, $R_6$ and $R_7=H$) is crystallised from methanol as rhombohedra of M.P. 115° (corrected) (not sharp). $[\alpha]_D^{20} = 106°$ (c.=0.2, in pyridine).

(IV) $(-)$-17-desmethoxy-17-ethoxy-reserpine (a) *Rearrangement.*—0.3 g. of $(-)$-17-desmethoxy-17-ethoxy-isoreserpic acid lactone are treated with 10% pivalic acid in xylene and worked up as indicated in Example 1 under (IVa). $(-)$-17-desmethoxy-17-ethoxy-reserpic acid lactone crystallises from methanol as needles of M.P. 277–279°, $[\alpha]_D^{20}=+88°$ (c.=0.2, in pyridine).

(b) *(—)-17-desmethoxy-17-ethoxy-reserpine.*—0.22 g. of (—)-17-desmethoxy-17-ethoxy-reserpic acid lactone are converted into the methyl ester and the latter is converted directly into the 3,4,5-trimethoxy-benzoate, as described in Example 1 under (IVb). The compound (Formula I: $R_1$, $R_2$, $R_4$, $R_6$, and $R_7=H$, $R_3=OCH_3$, $R_5=CH_2CH_3$, and $R_8=3,4,5$-trimethoxy-benzoyl) crystallises from acetone-water as prisms of M.P. 240–242°, $[\alpha]_D^{20}=-149°$ (c.=0.2, in pyridine).

EXAMPLE 7.—(—)-17-DESMETHOXY-17-ISOPROPOXY-RESERPINE (I) *1,2,3,4,7,8,9,10 - octahydro-2-isopropoxy-3-acetoxy-7-oxo-1-naphthoic acid*

2.0 g. of decahydro-2-isopropoxy-3,5-oxido-6-bromo-7-oxo - 8 - hydroxy-1-naphthoic acid lactone (Formula II: $R_5=$iso-$C_3H_7$) (preparation cf. J. Am. Chem. Soc. 78, 2023 [1956]) are suspended in 50 cc. of acetic acid anhydride and treated with 2.0 g. of zinc dust at 40°, with intense stirring, the reaction vessel being cooled externally with water immediately after addition of the zinc dust. Despite this cooling, the temperature of the solution rises from 40° to 55° within 2½ minutes, and then rapidly falls again. After a total reaction time of 5 minutes, the zinc dust is filtered off, the filtrate is evaporated at 60° in a vacuum caused by a water-jet, the residue is dissolved in 4 cc. of acetone and 7 cc. of water, the solution is allowed to stand at room temperature for 5 hours in order to saponify the mixed anhydrides thus produced, and then diluted with 20 cc. of water and extracted thrice with chloroform. After drying over sodium sulphate the solution on evaporation leaves a partially crystalline residue which yields from acetone-ether 1.2 g. of 1,2,3,4,7,8,9,10-octahydro-2-isopropoxy-3-acetoxy-7-oxo-1-naphthoic acid (Formula III: $R_5=$iso-$C_3H_7$) corresponding to a yield of 70% of the theoretical.

(II) *Hydroxy-acid lactum (Formula V:*
$R_3=OCH_3$, $R_5=$iso-$C_3H_7$)

The racemic acetoxy-acid of Formula III, wherein $R_5=$iso-$C_3H_7$ thus obtained, is first separated into the optical antipodes via the brucine salt, according to known methods. 0.93 g. of (—)-acetoxy-acid (Formula III: $R_5=$iso-$C_3H_7$) are oxidised, the oxidation product is esterified with diazomethane, the aldehyde-dicarboxylic acid ester thus produced is condensed with 6-methoxy-tryptamine, and the Schiff's base thus formed is reduced, as indicated in Example 1. After saponification of the reduction product, there is obtained a (—)-hydroxy-acid lactone of Formula V, wherein $R_1$, $R_2$, $R_4$, $R_6$, and $R_7=H$, $R_5=CH(CH_3)_2$, and $R_3=OCH_3$. The new compound crystallises from acetone as prisms of M.P. 139°. $[\alpha]_D^{20}=+47°$ (c.=0.2, in pyridine).

(III) *(—)-17-desmethoxy-17-isopropoxy-isoreserpic acid lactone*

(a) *Lactone-lactam.*—2.92 g. of (—)-hydroxy-acid lactam are heated to boiling under reflux in benzene with acetic anhydride/sodium acetate overnight, as described in Example 1 under (IIIa). The lactone-lactam is obtained as a yellow foam which could not be crystallised.

(b) *(—) - dehydro - 17 - desmethoxy - 17 - isopropoxy-reserpic acid lactone.*—2.74 g. of the lactone-lactam described under (a) is heated with phosphorus oxychloride and worked up as indicated in Example 1 under (IIIb). The new compound is obtained from methanol as small plates of M.P. 215–220° (corrected). $[\alpha]_D^{20}=+105°$ (c.=0.2, in pyridine).

(c) *(—) - 17 - desmethoxy - 17-isopropoxy-isoreserpic acid lactone.*—2.32 g. of the 3-dehydro-lactone described under (b) are reduced with sodium boron hydride and worked up as described in Example 1 under (IIIc). The new compound (Formula VIII: $R_1$, $R_2$, and $R_4=H$, $R_3=OCH_3$, $R_5=CH(CH_3)_2$, $R_6$ and $R_7=H$) crystallises from acetone-ether as prisms of M.P. 210–212° (corrected), $[\alpha]_D^{20}=-113°$ (c.=0.2, in pyridine).

(IV) *(—)-17-desmethoxy-17-isopropoxy-reserpine*

(a) *Rearrangement.*—1.05 g. of (—)-17-desmethoxy-17-isopropoxy-isoreserpic acid lactone are treated with 10% pivalic acid in xylene and worked up as indicated in Example 1 under (IVa). (—)-17-desmethoxy-17-isopropoxy-reserpic acid lactone crystallises from acetone-ether as prisms of M.P. 237–238°, $[\alpha]_D^{20}=+89°$ (c.=0.2, in pyridine).

(b) *(—) - 17 - desmethoxy-17-isopropoxy-reserpine.*—0.7 g. of (—)-17-desmethoxy-17-isopropoxy-reserpic acid lactone are converted into the methyl ester and the latter is converted directly into the 3,4,5-trimethoxy-benzoate, as described in Example 1 under (IVb). The compound (Formula I: $R_1$, $R_2$, $R_4$, $R_6$, and $R_7=H$, $R_3=OCH_3$, $R_5=CH(CH_3)_2$, and $R_8=3,4,5$-trimethoxy-benzoyl) crystallises from methanol as prisms of M.P. 248–250°, $[\alpha]_D^{20}=-125°$ (c.=0.2, in pyridine).

EXAMPLE 8.—(—)-17-DESMETHOXY-17-N-PROPOXY-RESERPINE (I) *1,2,3,4,7,8,9,10-octahydro-2-n-propoxy-3-acetoxy-7-oxo-1-naphthoic acid*

2.0 g. of decahydro-2-propoxy-3,5-oxido-6-bromo-7-oxo-8-hydroxy-1-naphthoic acid lactone (Formula II: $R_5=$n-$C_3H_7$) (preparation cf. J. Am. Chem. Soc. 78, 2023 [1956]) in acetic acid anhydride is treated with zinc dust and worked up as described in Example 1 under I. The compound (Formula III: $R_5=$n-$C_3H_7$) crystallises from ether as small plates of M.P. 171–172°. Yield 70% of theoretical.

(II) *Hydroxy-acid lactam (Formula V:*
$R_3=OCH_3$, $R_5=$n-$C_3H_7$)

The racemic acetoxy-acid thus obtained (Formula III, wherein $R_5=$n-$C_3H_7$), is first separated into its optical antipodes via the brucine salt according to known methods. 4.19 g. of (—)-acetoxy-acid (Formula III, $R_5=$n-$C_3H_7$)

is oxidised, the oxidation product is esterified, the aldehyde-dicarboxylic acid ester produced is condensed with 6-methoxy-tryptamine, and the Schiff's base thus formed is reduced, as indicated in Example 1 under (IIb). After saponification of the reduction product, a (—)-hydroxy-acid lactam of Formula V is obtained, wherein $R_1$, $R_2$, $R_4$, $R_6$, and $R_7=H$, $R_3=OCH_3$, and $R_5=CH_2CH_2CH_3$. The compound could not be crystallised.

(III/IV) *(—)-17-desmethoxy-17-n-propoxy-reserpine*

The hydroxy-acid lactam thus obtained is converted according to the methods described in the previous Examples via the corresponding intermediate products (see table, below) into (—)-17-desmethoxy-17-n-propoxy-reserpine (Formula I: $R_1$, $R_2$, $R_4$, $R_6$, and $R_7=H$, $R_3=OCH_3$, $R_5=$n-$C_3H_7$, and $R_8=3,4,5$-trimethoxy-benzoyl. The compound crystallises from methanol as prisms of M.P. 215–217°, $[\alpha]_D^{20}=-157°$ (c.=0.2, in pyridine).

EXAMPLE 9.—(—)-11-HYDROXY-DESERPIDINE

Catalytic hydrogenation of (—)-11-benzyloxy-deserpidine of M.P. 144–145° (prepared according to the methods described in the previous examples) in ethyl acetate in the presence of a palladium catalyst yields (—)-11-hydroxy-deserpidine (Formula I: $R_1$, $R_2$, $R_4$, $R_6$, and $R_7=H$, $R_3=OH$, $R_5=CH_3$, $R_8=3,4,5$-trimethoxy-benzoyl) which is obtained from alcohol as a microcrystalline powder of M.P. 166–168°. $[\alpha]_D^{20}=-165°$ (c.=0.2, in pyridine).

EXAMPLE 1.—RESERPIC ACID-METHYL ESTER-BENZOYL ACETATE (I/II) *Hydroxy-acid lactam (formula V: $R_3$=$OCH_3$, $R_5$=$CH_3$)*

1.69 g. of (—)-1,2,3,4,7,8,9,10-octahydro-2-methoxy-3-acetoxy-7-oxo-1-naphthoic acid of M.P. 223–225° (Formula III: $R_5$=$CH_3$) (prepared according to the methods described in Example 1), which will be referred to as (—)-acetoxy-acid in the following, are dissolved in 18 cc. of dioxan, the solution is treated with 18 mg. of solid osmium tetroxide and then with 7.53 g. of crystalline sodium periodate in 60 cc. of water. After allowing to stand at room temperature for 14 hours, the solution is extracted thrice with ethyl acetate, the extract dried over sodium sulphate, filtered, and the filtrate is treated with ethereal diazomethane solution until a permanent yellow colouration is attained. The solution is evaporated to dryness in vacuo at a bath temperature of about 35°, the residue is taken up in 20 cc. of benzene, and treated with a solution of 1.14 g. of 6-methoxy-tryptamine in 30 cc. of benzene. After allowing to stand at room temperature for 4 minutes, it is evaporated to dryness in vacuo at a bath temperature of 30° and the residue is dissolved in 30 cc. of methanol. The solution is treated with 690 mg. of sodium boron hydride, allowed to stand at room temperature for 6 minutes and on the water bath for 4 minutes whereupon 30 drops of glacial acetic acid are added to the clear solution. It is concentrated in vacuo and distributed between 1 N hydrochloric acid and ethyl acetate. The solution in ethyl acetate is washed with water and with a saturated solution of common salt, and the aqueous extracts are again extracted twice with ethyl acetate. The united ethyl acetate extracts are dried with sodium sulphate, and the solvent is removed in vacuo. The amorphous residue is dissolved in a mixture of 30 cc. of methanol and 18 cc. of 1 N sodium hydroxide solution, the solution is heated to the boil under reflux for 45 minutes, acidified with hydrochloric acid until acid to Congo, and the major portion of the methanol is removed in vacuo, whereupon there are obtained 1.5 g. of (—)-hydroxy-acid lactam of Formula V, wherein $R_1$, $R_2$, $R_4$, $R_6$, and $R_7$=H, $R_3$=$OCH_3$, and $R_5$=$CH_3$, corresponding to a yield of 60% of theoretical. Prisms from diluted methanol of M.P. 152–153° (uncorrected) $[\alpha]_D^{20}$=+48° (c.=0.2, in pyridine).

(III) *Isoserpic acid lactone*

(a) *Lactone-lactam.*—1.5 g. of hydroxy-acid lactam are heated under reflux in benzene with acetic anhydride/sodium acetate during 5 hours, as described in Example 1 under (IIIa). The lactone-lactam (Formula VI: $R_3$=$OCH_3$, $R_5$=$CH_3$) is obtained as an amorphous residue which could not be induced to crystallise. Yield, 1.35 g.

(b) *3-dehydro-reserpic acid lactone.*—1.05 g. of the lactone-lactam described under (a) is treated with phosphorus oxychloride and worked up as in Example 1 under (IIIb). Methanol yields 0.7 g. of the compound (Formula VII: $R_3$=$OCH_3$, $R_5$=$CH_3$). Needles of M.P. 290–292° (uncorrected). $[\alpha]_D^{20}$=+114° (c.=0.3, in pyridine). Yield 0.7 g. or 70% of the theoretical.

(c) *Isoreserpic acid lactone.*—0.2 g. of 3-dehydroreserpic acid lactone in 50% aqueous acetic acid are hydrogenated with a platinum catalyst and worked up as described in Example 2 under (IIIc). The isoreserpic acid lactone of the Formula VIII wherein $R_1$, $R_2$, $R_4$, $R_6$, and $R_7$=H, $R_3$=$OCH_3$, and $R_5$=$CH_3$ is obtained, from methanol as needles of M.P. 224–225° (uncorrected). $[\alpha]_D^{20}$=—142° (c.=0.3, in pyridine). Yield 157 mg. or 85% of theoretical.

(IV) *Reserpic acid-methyl ester-benzoyl acetate*

(a) *Rearrangement.*—1.5 g. of isoreserpic acid lactone are boiled under reflux with a solution of 14 cc. of 8:2 xylene-pivalic acid for 16 hours in an atmosphere of nitrogen. After cooling, the product is distributed between dilute ammonium hydroxide solution and chloroform, regardless of the crystalline precipitate. The residue of the chloroform solution yields from methanol reserpic acid lactone (Formula IX: $R_1$, $R_2$, $R_4$, $R_6$, and $R_7$=H, $R_3$=$OCH_3$, $R_5$=$CH_3$) as needles of M.P. 326–329°. $[\alpha]_D^{20}$=+84% (c.=0.2, in pyridine).

(b) (—)-*reserpic acid methyl ester.*—0.8 g. of (—)-reserpic acid lactone is boiled under reflux, with exclusion of water, with a dilute solution of sodium methylate (prepared by dissolving 125 mg. of sodium in 40 cc. of anhydrous methanol) for 1½ hours. After cooling, the clear solution is exactly neutralised with dilute hydrochloric acid and evaporated to dryness in vacuo. The residue is distributed between methylene chloride and dilute ammonium hydroxide solution. The hydroxy-ester crystallises from ethyl acetate as needles of M.P. 244–245°. $[\alpha]_D^{20}$=—77° (c.=0.2, in pyridine).

(c) 300 mg. of reserpic acid methyl ester and 15 cc. of benzoyl-acetic acid ethyl ester are heated on the water bath for 4 hours. After removal of the solvent under high vacuum at 110°, the residue is rubbed with a little methanol and filtered off with suction yielding the benzoyl-acetate. Reserpic acid benzoyl-acetate (Formula I: $R_1$, $R_2$, $R_4$, $R_6$, and $R_7$=H, $R_3$=$OCH_3$, $R_5$=$CH_3$, and $$R_8=CO-CH_2-CO-C_6H_5)$$

crystallises from ethanol as colourless, cohering prisms decomposing at 228–228.5°. $[\alpha]_D$=—66° (c.=0.2, in pyridine).

The following table lists a series of other, previously unknown reserpine-like compounds, together with the intermediate products obtained in each case as well as their properties.

| Compound | Intermediary | Formula | Crystals | M.P. (degrees) | $[\alpha]_D^{20}$ c.=0.2–0.5 in Pyridine (degrees) |
|---|---|---|---|---|---|
| (+)-10,11-methylene-dioxy-deserpidine $R_2+R_3$=—O·$CH_2$·O—, $R_5$=$CH_3$, $R_8$=3,4,5-trimethoxy-benzoyl. |  | I | Needles from methanol | 252–254 | +158 |
|  | Hydroxy-acid-lactam | V | Rhombic leaflets from methanol/water. | 151–153 | —49 |
|  | Lactone-lactam | VI | Needles from ethyl acetate | 218–220 | +32 |
|  | 3-dehydro-lactone | VII | Plates from methanol | 273–275 | —96 |
|  | Iso-lactone | VIII | ____do____ | 145–147 | +78 |
|  | (+)-10,-methylene-dioxy-deserpidic-acid-lactone. | IX | Needles from methanol | 303–310 | —52 |
| (—)-10-benzyloxy-deserpidine $R_2$=$OCH_2$—$C_6H_5$, $R_5$=$CH_3$, $R_8$=3,4,5-trimethoxy-benzoyl. |  | I | Needles from methanol | 150–152 | —152 |
|  | Hydroxy-acid-lactam | V | Polyhedra from methanol/water. | 125–128 | +42 |
|  | Lactone-lactam | VI | Hexagonal columns from ethyl acetate | 198–200 | —31 |
|  | 3-dehydro-lactone | VII | Fine needles from methanol | 260–263 | +104 |
|  | Iso-lactone | VIII | Fine needles from methanol/water. | 147–149 | —68 |
|  | (—)-10-benzyloxy-deserpidic acid-lactone. | IX | Needles from methanol | 260–265 | +50 |

| Compound | Intermediary | Formula | Crystals | M.P. (degrees) | $[\alpha]_D^{20}$ c.=0.2-0.5 in Pyridine (degrees) |
|---|---|---|---|---|---|
| (−)-11-benzyloxy-deserpidine $R_3$=OCH$_2$—C$_6$H$_5$, $R_5$=CH$_3$, $R_8$=3,4,5-trimethoxy-benzoyl. |  | I | Needles from acetone/water | 144-145 | −149 |
|  | Hydroxy-acid-lactam | V | do | 159-165 | +36 |
|  | Lactone-lactam | VI | Needles from ethyl acetate | 203 | −13 |
|  | 3-dehydro-lactone | VII | Needles from methanol | 275 | +92 |
|  | Iso-lactone | VIII | Needles from ethyl acetate | 238-240 | −106 |
|  | (−)-11-benzyloxy-deserpidic acid-lactone. | IX | Prisms from methanol/ether | 271-272 | +69 |
| (−)-9-methyl-deserpidine $R_1$=CH$_3$, $R_5$=CH$_3$, $R_8$=3,4,5-trimethoxy-benzoyl. |  | I | Needles from ethanol/water | 175-180 | −137 |
|  | Hydroxy-acid-lactam | V | Polyhedra from methanol/water. | 155-160 | +46 |
|  | Lactone-lactam | VI | Rhombohedral plates from ethyl acetate. | 197-199 | −31 |
|  | 3-dehydro-lactone | VII | Needles from methanol | 275-277 | +125 |
|  | Iso-lactone | VIII | Short prisms from methanol | 240-242 | −72 |
|  | (−)-9-methyl-deserpidic acid-lactone. | IX | Needles from methanol | 313-320 | +56 |
| (−)-11-methyl mercapto-deserpidine $R_3$=SCH$_3$, $R_5$=CH$_3$, $R_8$=3,4,5-Trimethoxy-benzoyl. |  | I | Prisms from methanol | 270-272 | −164 |
|  | Hydroxy-acid-lactam | V | Needles from methanol water. | 153-155 | +48 |
|  | Lactone-lactam | VI | Prisms from ethyl acetate | 172-173 | −29 |
|  | 3-dehydro-lactone | VII | Not characterised in detail |  |  |
|  | Iso-lactone | VIII | Needles from methanol | 259-261 | −170 |
|  | (−)-11-methylmercapto-deserpidic acid-lactone. | IX | Fine needles from methanol | 317-320 | +72 |
| (−)-11-propoxydeserpidine $R_3$=O-n-C$_3$H$_7$, $R_5$=CH$_3$, $R_8$=3,4,5-trimethoxy-benzoyl. |  | I | Prisms from methanol | 215-217 | −160 |
|  | Hydroxy-acid-lactam | V | Prisms from methanol/water | 160-162 | +41 |
|  | Lactone-lactam | VI | Amorphous |  |  |
|  | 3-dehydro-lactone | VII | Needles from methanol | 283-285 | +103 |
|  | Iso-lactone | VIII | Six-sided leaflets from methanol. | [1] 185-187 | −117 |
|  | (−)-11-propoxy-deserpidic-acid-lactone. | IX | Prisms from methanol | 286-290 | +70 |
| (−)-11-iso-propoxy-deserpidine $R_3$=OCH(CH$_3$)$_2$, $R_5$=CH$_3$, $R_8$=3,4,5-trimethoxy-benzoyl. |  | I | Needles from alcohol | 255-258 | −155 |
|  | Hydroxy-acid-lactam | V | Coarse prisms from methanol/water. | 158-161 | +36 |
|  | Lactone-lactam | VI | Amorphous |  |  |
|  | 3-dehydro-lactone | VII | Needles from methanol | 287-289 | +101 |
|  | Iso-lactone | VIII | Amorphous |  |  |
|  | (−)-11-iso-propoxy-deserpidic acid-lactone. | IX | Needles from methanol | 307-309 | +68 |
| (−)-9-methoxy-deserpidine $R_1$=OCH$_3$, $R_5$=CH$_3$, $R_8$=3,4,5-trimethoxy-benzoyl. |  | I | Needles from dilute alcohol | [2] 203-205 | −133 |
|  | Hydroxy-acid-lactam | V | Double pyramids from methanol. | 235-237 | +45 |
|  | Lactone-lactam | VI | Rhombic leaflets from ethyl acetate. | 175-177 | −135 |
|  | 3-dehydro-lactone | VII | Needles from methanol | 278-280 | +168 |
|  | Iso-lactone | VIII | Polyhedra from methanol | [1] 193-195 | −61 |
|  | (−)-9-methoxy-deserpidic acid-lactone. | IX | Needles from methanol | 292-295 | +57 |
| (−)-11-butoxy-deserpidine $R_3$=O-n-C$_4$H$_9$, $R_5$=CH$_3$, $R_8$=3,4,5-trimethoxy-benzoyl. |  | I | Prisms from ethyl acetate-hexane. | 203-204 | −162 |
|  | Hydroxy-acid-lactam | V | Fine prisms from methanol/water. | 163-165 | +53 |
|  | Lactone-lactam | VI | Amorphous |  |  |
|  | 3-dehydro-lactone | VII | Needles from methanol | 263-265 | +116 |
|  | Iso-lactone | VIII | Prisms from diluted methanol. | 158-164 | −117 |
|  | (−)-11-butoxy-deserpidic acid-lactone. | IX | Prisms from methanol | 259-260 | +49 |
| (−)-11-ethyl-mercapto-deserpidine $R_3$=SC$_2$H$_5$, $R_5$=CH$_3$, $R_8$=3,4,5-trimethoxy-benzoyl. |  | I | Prisms from methanol | 250-252 | −160 |
|  | Hydroxy-acid-lactam | V | Fine prisms from methanol/water. | 160-164 | +48 |
|  | Lactone-lactam | VI | Rosettes from ethyl acetate | 133-135 | −33 |
|  | 3-dehydro-lactone | VII | Needles from methanol | 294-296 | +94 |
|  | Iso-lactone | VIII | Prisms from methanol | 237-239 | −152 |
|  | (−)-11-ethylmercapto-deserpidic acid-lactone. | IX | Fine needles from methanol | 325-327 | +87 |
| (−)-17-desmethoxy-17-propoxy-reserpine $R_3$=OCH$_3$, $R_5$=n-C$_3$H$_7$, $R_8$=3,4,5-trimethoxybenzoyl. |  | I | Prisms from methanol | 215-217 | −157 |
|  | Hydroxy-acid-lactam | V | Amorphous |  |  |
|  | Lactone-lactam | VI | do |  |  |
|  | 3-dehydrolactone | VII | Fine prisms from methanol | 238-240 | +122 |
|  | Iso-lactone | VIII | Prisms from methanol | 87 | −109 |
|  | (−)-17-desmethoxy-17-propoxyreserpic acid-lactone. | IX | do | 234-235 | +89 |
| (−),(d)-5-methylreserpine [3] $R_3$=OCH$_3$, $R_5$ and $R_6$=CH$_3$, $R_8$=3,4,5-trimethoxybenzoyl. |  | I | Prisms from methanol | 254 | −165 |
|  | Hydroxy-acid-lactam | V | Amorphous foam not characterised in detail. |  |  |
|  | Lactone-lactam | VI | Prisms from ethyl acetate | 193-194 | −18 |
|  | 3-dehydro-lactone | VII | Amorphous |  |  |
|  | Iso-lactone | VIII | Fine needles from methanol | 261 | −96 |
|  | (−),(d)-5-methyl-reserpic acid-lactone. | IX | Fine prisms from methanol | 307-310 | +83 |

See footnotes at end of table.

| Compound | Intermediary | Formula | Crystals | M.P. (degrees) | $[\alpha]_D^{20}$ c.=0.2–0.5 in Pyridine (degrees) |
|---|---|---|---|---|---|
| (−)-10,11-dimethoxy-deserpidine $R_2$ and $R_3$=$OCH_3$, $R_5$=$CH_3$, $R_8$=3,4,5-trimethoxy-benzoyl. | | I | Needles from methanol | 264–266 | −157 |
| | Hydroxy-acid-lactam | V | Fine needles from methanol/water in presence of small amounts of methylene chloride. | 128–130 | +38 |
| | Lactone-lactam | VI | Amorphous foam not characterised in detail. | | |
| | 3-dehydro-lactone | VII | Needles from methanol | 314–316 | +108 |
| | Iso-lactone | VIII | Short, coarse prisms from methanol. | 217–219 | −110 |
| | (−)-10,11-dimethoxy-deserpidic acid-lactone. | IX | Needles from methanol | 322–324 | +72 |
| Reserpic acid-methyl ester-myristate $R_3$=$OCH_3$, $R_5$=$CH_3$, $R_8$=$CO$-$(CH_2)_{12}$-$CH_3$. | | I | Colourless small needles from methylene chloride-ethyl-acetate. | 202–203 (decomp.) | −64 |
| | Hydroxy-acid-lactam | V | Prisms from methanol | 152–153 | +48 |
| | Lactone-lactam | VI | Amorphous | | |
| | 3-dehydro-lactone | VII | Needles from methanol | 290–292 | +114 |
| | Isoreserpic acid-lactone | VIII | do | 224–225 | −142 |
| | Reserpic acid-lactone | IX | do | 326–329 | +84 |
| Reserpic acid-methyl ester-(α-phenyl)-aceto-acetate $R_3$=$OCH_3$, $R_5$=$CH_3$, $R_8$=$CO$—$CH$—$CO$—$CH_3$. $\quad\quad\quad\quad\quad\quad\quad\;\;\,|$ $\quad\quad\quad\quad\quad\quad\quad\;\,C_6H_5$ | | I | Colourless prisms from chloroform-ether. | 238–239 (decomp.) | −78 |

Intermediates as for reserpic acid-methyl ester-myristate.

¹ Sinters at 130°.   ² Sinters at 180°.   ³ The term "(d)" refers to the dextro-rotatory antipodes of 6-methoxy-α-methyl-tryptamine.

What we claim is:
1. (−)-11-hydroxy-deserpidine.
2. (−)-Reserpic acid-methylester-benzoylacetate.
3. (−)-11-ethylmercapto-deserpidine.
4. (−)-Reserpic acid-methylester-(α-phenyl)-acetoacetate.

References Cited

UNITED STATES PATENTS

| | | | |
|---|---|---|---|
| 2,857,385 | 10/1958 | Kuehne | 260—286 |
| 2,883,384 | 4/1959 | Woodward | 260—287 |
| 2,988,552 | 6/1961 | Jolly et al. | 260—287 |
| 3,169,967 | 2/1965 | Schlittler | 260—287 |
| 3,260,722 | 7/1966 | Velluz et al. | 260—287 |

FOREIGN PATENTS 744,290   2/1956   Great Britain.

OTHER REFERENCES

Experientia, vol. XI, No. 8, Aug. 15, 1955.
Woodward: J. Am. Chem. Soc., vol. 78, pp. 2023–2025, May 5, 1956.
Lowy: An Intro. to Org. Chem., Wiley and Sons, New York, N.Y. (1945), page 213.

J. T. PATTEN, *Primary Examiner.*

H. J. LIDOFF, I. MARCUS, *Examiners.*

W. KAUFMAN, J. E. PHILLIPS, *Assistant Examiners.*